(12) United States Patent
Asahara et al.

(10) Patent No.: US 12,460,182 B2
(45) Date of Patent: Nov. 4, 2025

(54) CELL-CONTAINING PHARMACEUTICAL COMPOSITION

(71) Applicant: CellAxia Inc., Tokyo (JP)

(72) Inventors: Takayuki Asahara, Kanagawa (JP); Amankeldi A. Salybekov, Kanagawa (JP); Makoto Seki, Tokyo (JP)

(73) Assignee: CellAxia Inc., Tokyo (JP)

( * ) Notice: Subject to any disclaimer, the term of this patent is extended or adjusted under 35 U.S.C. 154(b) by 933 days.

(21) Appl. No.: 17/612,441

(22) PCT Filed: Aug. 19, 2019

(86) PCT No.: PCT/JP2019/032322
§ 371 (c)(1),
(2) Date: Nov. 18, 2021

(87) PCT Pub. No.: WO2021/033247
PCT Pub. Date: Feb. 25, 2021

(65) Prior Publication Data
US 2022/0218744 A1  Jul. 14, 2022

(51) Int. Cl.
| | | |
|---|---|---|
| C12N 5/0786 | (2010.01) | |
| A61K 40/10 | (2025.01) | |
| A61K 40/17 | (2025.01) | |
| A61K 40/22 | (2025.01) | |
| A61K 40/24 | (2025.01) | |
| A61K 40/41 | (2025.01) | |
| A61P 29/00 | (2006.01) | |

(52) U.S. Cl.
CPC ............ *C12N 5/0645* (2013.01); *A61K 40/10* (2025.01); *A61K 40/17* (2025.01); *A61K 40/22* (2025.01); *A61K 40/24* (2025.01); *A61K 40/416* (2025.01); *A61P 29/00* (2018.01); *A61K 2239/31* (2023.05); *A61K 2239/38* (2023.05); *C12N 2500/90* (2013.01)

(58) Field of Classification Search
None
See application file for complete search history.

(56) References Cited

U.S. PATENT DOCUMENTS

| | | |
|---|---|---|
| 9,844,570 B2 | 12/2017 | Yoshida et al. |
| 10,286,014 B2 | 5/2019 | Asahara et al. |
| 10,376,544 B2 | 8/2019 | Yoshida et al. |
| 10,639,335 B2 | 5/2020 | Yoshida et al. |
| 2015/0196600 A1 | 7/2015 | Yoshida et al. |
| 2015/0238538 A1 | 8/2015 | Asahara et al. |
| 2017/0204374 A1 | 7/2017 | Iyoku et al. |
| 2018/0050067 A1 | 2/2018 | Yoshida et al. |
| 2019/0307806 A1 | 10/2019 | Yoshida et al. |
| 2021/0230553 A1 | 7/2021 | Iyoku et al. |

FOREIGN PATENT DOCUMENTS

| | | | |
|---|---|---|---|
| JP | 6372782 B2 * | 8/2018 | ............ A61K 35/14 |
| WO | 2014/027684 A1 | 2/2014 | |
| WO | 2014/051154 A1 | 4/2014 | |
| WO | 2016/161462 A1 | 10/2016 | |
| WO | WO-2016185026 A1 * | 11/2016 | ......... A61K 31/7034 |
| WO | WO-2018055153 A1 * | 3/2018 | ............ A61K 35/15 |

OTHER PUBLICATIONS

Stemcell technologies "Immunocult-SF macrophage medium" product catalog (Year: 2017).*
All in the Difference "understanding the key differences between disorder and disease" (Year: 2023).*
Miller-Keane Encylopedia and Dictionary of Medicine, Nursing, and Allied Health. Seventh Edition (2003) (Year: 2025).*
International Search Report issued Oct. 21, 2019 in International Application No. PCT/JP2019/032322.
Cheng et al., "Bone marrow-derived innate macrophages attenuate oxazolone-induced colitis", Cellular Immunology, 2017, vol. 311, pp. 46-53 (8 pages total).
Salybekov et al., "Regeneration-Associated Cells Improve Recovery from Myocardial Infarction through Enhanced Vasculogenesis, Anti-inflammation, and Cardiomyogenesis", bioRxiv, 2018, http://dx.doi.org/10.1101/396101.
Salybekov et al., "Regeneration-associated cells improve recovery from myocardial infarction through enhanced vasculogenesis, anti-inflammation, and cardiomyogenesis", PLOS ONE, 2018, vol. 13, No. 11, e0203244 pp. 1-24 (24 pages total).
Masuda et al., "Vasculogenic Conditioning of Peripheral Blood Mononuclear Cells Promotes Endothelial Progenitor Cell Expansion and Phenotype Transition of Anti-Inflammatory Macrophage and T Lymphocyte to Cells With Regenerative Potential", Journal of the American Heart Association, 2014, vol. 3, e000743, pp. 1-29 (29 pages total).
Fischer et al., "Pulmonary Passage is a Major Obstacle for Intravenous Stem Cell Delivery: The Pulmonary First-Pass Effect", Stem Cells and Development, 2009, vol. 18, No. 5, pp. 683-691 (9 pages total).
Morikawa et al., "Prospective identification, isolation, and systemic transplantation of multipotent mesenchymal stem cells in murine bone marrow", J. Exp. Mol., vol. 206, No. 11, pp. 2483-2496 (14 pages total).
Mabuchi et al., "LNGFR+THY-1+VCAM-1hi+ Cells Reveal Functionally Distinct Subpopulations in Mesenchymal Stem Cells", Stem Cell Reports, 2013, vol. 1, pp. 152-165 (14 pages total).
Masuda et al., "Development of Serum-Free Quality and Quantity Control Culture of Colony-Forming Endothelial Progenitor Cell for Vasculogenesis", Stem Cells Translational Medicine, 2012, vol. 1, pp. 160-171 (12 pages total).

* cited by examiner

*Primary Examiner* — Tracy Vivlemore
*Assistant Examiner* — John David Moore
(74) *Attorney, Agent, or Firm* — Sughrue Mion, PLLC

(57) ABSTRACT

A pharmaceutical composition containing a cell population with enriched M2 macrophage and a pharmaceutically acceptable carrier is provided. The composition is not trapped in the lungs when administered systemically, and accumulates at a disorder/inflammation site. Therefore, the pharmaceutical composition of the present invention is useful as an anti-inflammatory pharmaceutical composition.

5 Claims, 9 Drawing Sheets

CELL-CONTAINING PHARMACEUTICAL COMPOSITION

CROSS REFERENCE TO RELATED APPLICATIONS

This application is a National Stage of International Application No. PCT/JP2019/032322, filed Aug. 19, 2019.

TECHNICAL FIELD

The present invention relates to a composition containing a cell population that accumulates at a lesion site. More particularly, the present invention relates to a cell-containing pharmaceutical composition that contains a cell population enriched with M2 macrophage and exhibits an anti-inflammatory effect by systemic administration.

BACKGROUND ART

In recent years, regenerative medicine technology that treats diseases by transplanting cells into patients so as to complement abnormalities in function and morphology is drawing attention. Mesenchymal stem cells (MSCs) are known to have immunosuppressive action and anti-inflammatory action, and accumulate in the lungs, liver, and spleen when administered systemically. Accordingly, they are not recruited to disordered sites by systemic administration (patent document 1, non-patent document 1). In addition, when MSCs isolated from living organisms contain cells that have lost chemotactic activity, the chemotactic activity of MSC is sometimes lost by culturing.

MUSE cells (patent document 2, non-patent document 2) and REC cells (patent document 3, non-patent document 3) are known as cells that solve these problems. However, since MUSE cells and REC cells are obtained by separating cells having a specific marker from MSC, it is necessary to go through complicated steps of sorting from MSC and growth culture.

On the other hand, a culture technique for increasing the number of cells involved in regeneration (vascular endothelial progenitor cell (EPC), anti-inflammatory macrophage, T cells) has been proposed as a stem cell therapy for ischemic diseases (patent document 4, non-patent documents 4, 5). In this culture technique, cells that can become naive peripheral blood inflammatory cells (monocyte, and type 1 macrophage, M1) are converted into cells with anti-inflammatory properties (type 2 macrophage, M2), and regulatory T cells, which are a subset of immunosuppressive helper T cells, increase as a result of decrease in cytotoxic T cells and natural killer (NK) cells and contribute to the regeneration of a wide range of tissues.

DOCUMENT LIST

Patent Documents patent document 1: WO2016/161462
patent document 2: WO2014/027684
patent document 3: WO2016/017795
patent document 4: WO2014/051154

Non-Patent Documents non-patent document 1: Fischer U M, et al., Stem Cells Dev. 2009; 18(5):683-92.
non-patent document 2: Morikawa S., J. Exp. Med. 2009; 206(11):2483-2496.
non-patent document 3: Mabuti Y., et al., Stem cell Reports. 2013; 1:152-165
non-patent document 4: Masuda H., et al., Stem cells Translational Medicine. 2012; 1:160-171
non-patent document 5: Masuda H., et al., Journal of the American Heart Association. 2014; e3

SUMMARY OF INVENTION

Technical Problem

The present invention aims to provide a pharmaceutical composition, particularly an anti-inflammatory pharmaceutical composition, containing a cell population enriched with cells that is not trapped in the lungs but migrates to the disordered sites when administered systemically, and a pharmaceutically acceptable carrier.

Solution to Problem

In view of the above-mentioned problem, the present inventors have conducted intensive studies and found that a cell population obtained by culturing body fluid-derived mononuclear cells under serum-free culture without medium change or passage is rich in M2 macrophage, is not easily trapped in the lungs, and has the ability to accumulate in the disordered sites. They have obtained some findings relating to the properties of the cell population, which resulted in the completion of the present invention. Accordingly, the present invention provides the following.

[1] A pharmaceutical composition comprising a cell population enriched in M2 macrophage and a pharmaceutically acceptable carrier.
[2] The pharmaceutical composition of the above-mentioned [1], wherein the cell population comprises the M2 macrophage in a proportion of not less than 7%.
[3] The pharmaceutical composition of the above-mentioned [1] or [2], wherein the cell population comprises the M1 macrophage in a proportion of less than 10%.
[4] The pharmaceutical composition of any of the above-mentioned [1] to [3], wherein the M2 macrophage is enriched by culturing body fluid-derived mononuclear cells in a serum-free medium, without medium change or passage.
[5] The pharmaceutical composition of any of the above-mentioned [1] to [4], wherein the composition is for systemic administration.
[6] The pharmaceutical composition of any of the above-mentioned [1] to [5], wherein the cell population has the following features:
  (1) not trapped in the lungs when systemically administered,
  (2) accumulating at a disordered/inflamed site, and
  (3) being derived from mononuclear cell.
[7] The pharmaceutical composition of any of the above-mentioned [1] to [6], wherein the composition is for the prophylaxis and/or treatment of an inflammatory disease.
[8] The pharmaceutical composition of the above-mentioned [7], wherein the inflammatory disease is an autoimmune disease.

Advantageous Effects of Invention

The pharmaceutical composition of the present invention contains a cell population enriched with M2 macrophage.

When the composition is systemically administered, the cell population is not trapped in the lungs and accumulates at the disordered/inflamed site. Therefore, the pharmaceutical composition of the present invention can transfer cells having an anti-inflammatory action in the number sufficient for the treatment to the target inflammation or tissue damaged site.

DESCRIPTION OF EMBODIMENTS

Figure 1:
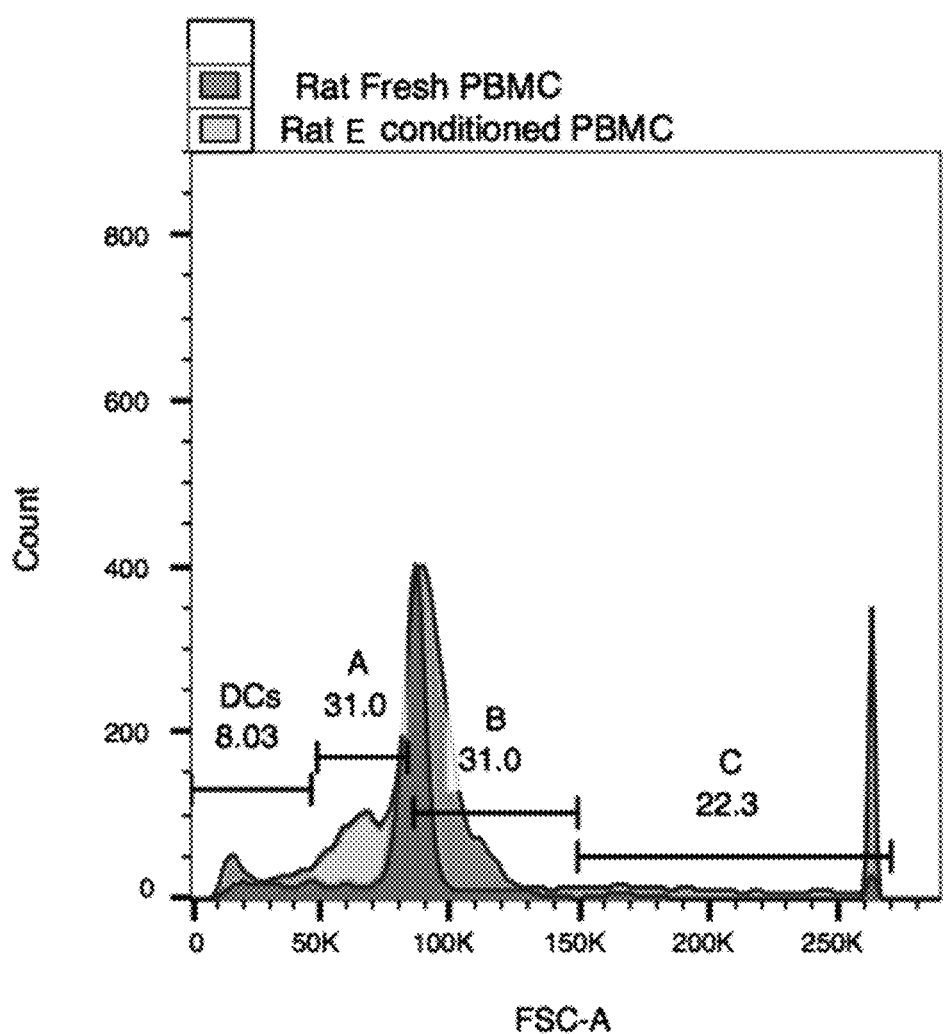
FIG. 1 shows the results of flow cytometric analysis of the cell population of the present invention. The rat PBMC cell suspension (Rat Fresh PBMC) before culturing and the rat PBMC cell suspension (Rat E conditioned PBMC) after E culturing were examined. Lymphocyte-sized cells (A), monocyte-sized cells (B), and macrophage-sized cell populations (C) were gated from the overall viable cell fraction.

The present invention provides a pharmaceutical composition containing a cell population that is not trapped in the lungs when administered systemically, and migrates to and accumulates at the disordered/inflamed site (hereinafter to be also referred to as the cell population of the present invention), and a pharmaceutically acceptable carrier (hereinafter to be also referred to as the pharmaceutical composition of the present invention).

The cell population of the present invention is a cell population enriched with M2 macrophages. It is obtained by culturing body fluid-derived mononuclear cells under serum-free culture without medium exchange or passaging. Therefore, the cell population of the present invention is derived from mononuclear cells. Examples of the body fluid include peripheral blood, bone marrow fluid and cord blood. The mononuclear cell refers to a leukocyte contained in peripheral blood, bone marrow, umbilical cord blood, and the like and having a nucleus close to a circle, or a leukocyte other than granulocytes. A mononuclear cell fraction is obtained by collecting body fluid (peripheral blood, bone marrow or umbilical cord blood) from an animal and subjecting same to, for example, a density gradient centrifugation method to extract the fraction. The density gradient centrifugation method is not particularly limited as long as a mononuclear cell fraction is formed. In the case of human, Histopaque-1077 is used. In the case of rat and mouse, Histopaque-1083 (Sigma-Aldrich) and the like are used.

The animal species from which the cell population of the present invention is derived includes, for example, human, mouse, rat, hamster, dog, cat, monkey, rabbit, bovine, horse, swine and the like. Human is preferred. The age of the individual from which the cell is derived is not particularly limited and may be an adult, a child or a fetus.

The culture of mononuclear cell in the present invention is performed by culturing a cell suspension containing mononuclear cells in a medium supplemented with a factor such as cytokine, and the like. As the cell suspension, a body fluid itself containing mononuclear cells (e.g., bone marrow fluid, cord blood, peripheral blood) can also be used. The culture conditions for mononuclear cells are not particularly limited, and the conditions generally employed in the art can be used. For example, the following culture conditions with addition of various factors can be mentioned.

Culture in the presence of one or 2 or more factors, preferably 3 or more factors, more preferably 4 or more factors selected from stem cell factor (SCF; S), Interleukin 6 (IL-6; I), FMS-like tyrosine kinase 3 ligand (FLT-3L; F), Thrombopoietin (TPO; T), and vascular endothelial cell growth factor (Vascular endopoietin; VEGF; V).

SCF to be used in the present invention is a glycoprotein with a molecular weight of about 30,000 consisting of 248 amino acids. There are soluble type and membrane-bound type by selective splicing, and the SCF to be used in the present invention may be any type of SCF as long as it is useful for culturing EPC and the like. It is preferably soluble. The origin and the like of SCF are not particularly limited, and a recombinant whose supply is expected to be stable is preferred, and a human recombinant is particularly preferred. Known ones are those commercially available. The concentration of SCF in a serum-free medium also varies depending on the kind of SCF to be used and is not particularly limited as long as it is useful for culturing mononuclear cells. For example, it is 10-1000 ng/mL.

IL-6 to be used in the present invention is a glycoprotein with a molecular weight of about 210,000 which is isolated as a factor that induces final differentiation of B cells into antibody-producing cells. It is known to be involved in the immune response, proliferation differentiation of hematopoietic and neuronal system cells, acute phase reaction, and the like. IL-6 to be used in the present invention is appropriately selected. When it is used for culturing mononuclear cells, human IL-6 is preferred, and a recombinant whose supply is expected to be stable is particularly preferred. Known ones are those commercially available. The concentration of IL-6 in a serum-free medium also varies depending on the kind of IL-6 to be used and is not particularly limited as long as it is useful for culturing mononuclear cells. For example, it is 1-500 ng/mL.

FLT-3L to be used in the present invention is known as a ligand for receptor tyrosine kinases that play an important role in early hematopoietic control. Several products by selective splicing are known, and they are reported to stimulate the proliferation of hematopoietic stem cells. The FLT-3L to be used in present invention may be any type of FLT-3L as long as it is useful for culturing monocytes and the like. Known ones are those commercially available. The concentration of FLT-3L in a serum-free medium also varies depending on the kind of FLT-3L to be used and is not particularly limited as long as it is useful for culturing mononuclear cells. For example, it is 10-1000 ng/mL.

TPO to be used in the present invention is one kind of hematopoietic cytokines, and is known to act specifically on the process of making megakaryocytes from hematopoietic stem cells and promote the production of megakaryocytes. The origin and the like of TPO are not particularly limited, and a recombinant whose supply is expected to be stable is preferred, and a human recombinant is particularly preferred. Known ones are those commercially available. The concentration of TPO in a serum-free medium also varies depending on the kind of TPO to be used and is not particularly limited as long as it is useful for culturing mononuclear cells. For example, it is 1-500 ng/mL.

VEGF that may be used in the present invention is a growth factor that acts specifically on the vascular endothelial progenitor cells (EPC), and is known to be produced mainly by cells around blood vessels. EPC is present in mononuclear cell fractions. Several kinds of VEGF proteins of different sizes are produced by selective splicing, and any type of VEGF can be used. VEGF165 is preferred. The origin and the like of VEGF are not particularly limited, and a recombinant whose supply is expected to be stable is preferred, and a human recombinant is particularly preferred. Known ones are those commercially available. The concentration of VEGF in a serum-free medium also varies depending on the kind of VEGF to be used and is not particularly limited as long as it is useful for culturing mononuclear cells. For example, it is 5-500 ng/mL.

Specifically, culture in the presence of a combination of the following factors can be mentioned.
S, I, F, T, V;
SI, SF, ST, SV, IF, IT, IV, FT, FV, TV;
SIF, SIT, SIV, SFT, SFV, STV, IFT, IFV, ITV, FTV;
SIFT, SITV, SIFV, SFTV, IFTV;
SIFTV.

Preferably, culture in the presence of a combination of the following factors can be mentioned.
SIF, SIT, SIV, SFT, SFV, STV, IFT, IFV, ITV, FTV.

More preferably, culture in the presence of a combination of the following factors can be mentioned.
SIFT, SITV, SIFV, SFTV, IFTV.

The concentration of mononuclear cells in a medium is not particularly limited as long as a cell population enriched with M2 macrophage is obtained. For example, it is about $0.5\text{-}10\times10^6$ cells/mL, more preferably about $1\text{-}7\times10^6$ cells/mL, most preferably about $3\text{-}6\times10^6$ cells/mL.

As the medium to be used in the present invention, a medium generally used in the pertinent field can be utilized. For example, a serum-free medium known as a medium for culturing mononuclear cells can be used, and a serum-free medium is preferred. Examples of the basal medium used as a serum-free medium include RPMI, DMEM, MEM, IMDM and the like.

In addition, it is preferable that various factors to be added to the medium of the present invention are all derived from an animal of the same species as the animal from which monocytes are derived. Using mononuclear cells and various factors with the same derivation, a cell culture product preferable for allograft such as allogeneic transplantation and the like can be obtained. In addition, by using mononuclear cells derived from an individual intended to receive cell transplantation, it is also possible to obtain a cell culture product suitable for syngenic transplantation.

While the mode of the cell population of the present invention is not particularly limited as long as the anti-inflammatory macrophages are enriched, a cell population enriched with M2 macrophages is preferred. For example, the cell population of the present invention can be obtained by culturing mononuclear cells in a serum-free medium containing the aforementioned factors. Here, the cell population enriched with anti-inflammatory macrophages means that the ratio of each cell with respect to the whole cell population increases not less than 2-fold, preferably not less than 4-fold, more preferably not less than 5-fold, after culturing in a serum-free medium containing the aforementioned factors as compared with the respective ratios with respect to the whole mononuclear cells before culturing. Since the cell population of the present invention has a markedly higher ratio of anti-inflammatory macrophages than that of the original mononuclear cells before culturing, it can effectively suppress inflammations.

M2 macrophages are enriched by culturing mononuclear cells in the medium. The culture is preferably performed in a serum-free medium, more preferably without medium exchange or passaging. The culture period of mononuclear cells is not particularly limited as long as the M2 macrophages are enriched to a desired degree. For example, the mononuclear cells are cultured under a 5% $CO_2$ atmosphere at 37° C. for not less than 3 days. The culture period is generally not more than 8 days, more preferably not more than 7 days, since medium exchange and passage are not desired.

The anti-inflammatory macrophage contained in the cell population of the present invention is an anti-inflammatory macrophage that contributes to tissue repair. It is preferably an M2 macrophage, more preferably a CD206-positive or CD163-positive M2 macrophage. These markers for M2 macrophages vary by animal species. In addition, commercially available fluorescent label antibodies for flow cytometry are limited. Therefore, CD206-positive or CD163-positive is used as a marker for human M2 macrophage, Galectin-3-positive, CD206-positive, or the like is used as a marker for mouse M2 macrophage, and CD163-positive is often used for rat M2 macrophage.

In the cell population of the present invention, the ratio of the anti-inflammatory macrophage in the cell population generally increases not less than 2-fold, preferably not less than 4-fold, more preferably not less than 5-fold, as compared with that of the cell population before the above-mentioned culture of mononuclear cells. When the anti-inflammatory macrophage is M2 macrophage, the proportion of the M2 macrophage enriched by the above-mentioned culture of the mononuclear cells in the case of human is generally 2% or less before culturing, although there are individual differences depending on the donor when analyzed using the above-mentioned M2 macrophage markers, but after culturing, the ratio of the M2 macrophages increases drastically as compared with that before culturing. Regarding multiples, M2 macrophages in PBMC before culture, which is the denominator, are often contained in less than 1%, and even in this case, M2 macrophages in mononuclear cells after E culture often reach 10% or more, as a result of which the magnification is enriched 10-fold to 100-fold. Consequently, in the case of human, for example, the proportion of M2 macrophages in the cultured cell population after culture is not less than 5%, mostly not less than 7%, not less than 8%, not less than 9%, generally not less than 10%, and as high as not less than 20%. From these, the cell population of the present invention contains not less than 7%, not less than 8%, not less than 9%, preferably about 10%, particularly preferably 15%, further more preferably not less than 20%, of M2 macrophages with respect to the total mononuclear cells. The cell population after culturing may be concentrated when desired in order to further increase the proportion of M2 macrophages. When the ratio of M2 macrophage is low, sufficient anti-inflammatory effect cannot be achieved.

Amplification of anti-inflammatory macrophages is appropriately selected, for example, according to the animal species of interest. CD206 (CD means Cluster of Differentiation) and/or CD163 for human; Galactin-3 and/or CD206 for mouse; and CD163 for rat are each labeled with an antibody having an affinity therefor and can be measured by flow cytometric analysis.

In the cell population of the present invention, the content of anti-inflammatory macrophage increases, and the content of inflammatory macrophage (e.g., M1 macrophage) decreases. In the cell population of the present invention, the ratio of the inflammatory macrophage in the cell population drastically decreases to not more than ½, generally not more than ¼, preferably not more than ⅛, as compared with that of the cell population before the above-mentioned culture of mononuclear cells. When the inflammatory macrophage is M1 macrophage, the ratio of M1 macrophage that has decreased by the above-mentioned culture of mononuclear cells may be less than 10%, less than 5%, preferably less than 3%, more preferably less than 2%, with respect to the total mononuclear cells after culture. When the ratio of M1 macrophage is high, the ratio of M2 macrophage becomes relatively low, and a sufficient anti-inflammatory effect cannot be achieved.

The decrease in inflammatory macrophages in human can be measured, for example, by labeling CCR2 (C—C chemokine receptor 2) with an antibody having an affinity therefor and performing flow cytometric analysis.

Alternatively, the cell population of the present invention may further contain anti-inflammatory Th2 cells and regulatory T cells. Therefore, the cell population of the present invention may also be a cell population further enriched with anti-inflammatory Th2 cells and regulatory T cells, in addition to anti-inflammatory macrophages.

The cells contained in the cell population of the present invention can be appropriately isolated and/or purified. For example, in the case of human, since CD206, CD163, and Galectin-3 are known as surface markers for anti-inflammatory macrophages, desired cells can be separated by a cell separation method using a substance (for example, an antibody) having an affinity for these cell surface markers. Examples of the cell separation method include magnetic cell separation method (MACS), and fluorescent cell separation method (FACS). As the surface marker, CD206 and CD163 are known for human, Galactin-3 and CD206 are known for mouse, and CD163 is known for rat.

Since the cell population of the present invention is enriched with anti-inflammatory macrophages, it can exhibit an anti-inflammatory action. In particular, as shown in the Examples described later, the cell population of the present invention can accumulate at the disordered/inflamed site without being trapped in the lungs when administered systemically. The systemic administration in the present invention means that a cell suspension circulates systemically by directly administering the cell suspension into a blood vessel (e.g., intravenous administration).

Even when transfer/trapping into the lung is observed, if it does not affect the accumulation at the disordered/inflamed site, such is also included in the present invention as substantially "not trapped in the lung".

The cell population of the present invention can be provided as a pharmaceutical composition containing the cell population and a pharmaceutically acceptable carrier. Since the cell population is rich in anti-inflammatory macrophages, it can provide an anti-inflammatory action. Therefore, the present invention can be provided as a pharmaceutical composition for the prophylaxis and/or treatment of inflammatory diseases.

The inflammatory disease may be any as long as it accompanies inflammation. For example, allergy associated diseases, respiratory related diseases, ischemic diseases, diabetes-related diseases, bone/cartilage inflammatory disease, cerebral neurological diseases, gastrointestinal tract inflammatory diseases, and autoimmune diseases and having inflammation can be mentioned. Specifically, various autoimmune diseases (rheumatoid arthritis (RA), SLE, scleroderma, polymyositis, Sjogren's syndrome, ANCA-associated vasculitis, Behcet's disease, Kawasaki disease, mixed cryoglobulinemia, multiple sclerosis, Guillain-Barre Syndrome, myasthenia gravis, type 1 diabetes, Basedow's disease, Hashimoto's disease, Addison's disease, IPEX, APS type-II, autoimmune myocarditis, interstitial pneumonia, bronchial asthma, autoimmune hepatitis, primary biliary cirrhosis, Crohn's disease, ulcerative colitis, psoriasis, atopic dermatitis, hemolytic anemia, autoimmune thyroiditis, polyarthritis type of idiopathic juvenile arthritis, etc.) can be mentioned.

The pharmaceutical composition of the present invention can be generally produced by mixing the cell population of the present invention, which is an active ingredient, with a pharmaceutically acceptable carrier. Specifically, an embodiment in which the cell population of the present invention is suspended in a liquid carrier is exemplified. The liquid carrier may be any as long as it can be injected into human. For example, phosphate buffer, saline, medium and the like can also be used. The liquid carrier may contain a compound preferable for cell survival such as albumin and the like. Preferably, patient-derived serum is recited as a compound containing albumin.

The pharmaceutical composition of the present invention contains the above-mentioned M2-rich MNC of the present invention as an active ingredient, and the M2-rich MNC contains a therapeutically effective amount of M2 macrophage. The therapeutically effective amount means the amount of M2 macrophage that can afford a therapeutic effect on the above-mentioned diseases when the pharmaceutical composition of the present invention is administered to a subject, as compared with a subject to which the pharmaceutical composition is not administered. The specific therapeutically effective amount can be appropriately determined according to the administration method, purpose of use, and the age, body weight, symptom and the like of the test subject.

EXAMPLE

The present invention is explained in further detail in the following by referring to Examples, which are described for the explanation of the present invention and do not limit the present invention in any way.

All experiments have been approved by the national and institutional ethics committees. The Tokai School of Medicine Animal Care and Use Committee give approval for these studies, based on Guide for the Care and Use of Laboratory Animals (National Research Council).

1. Isolation and Culture of PBMC (Rat)

A total of 120 rats were used. The peripheral blood was collected from the abdominal aorta of rat under anesthesia using a heparinized (500 IU) winged needle attached to 10 mL syringe, and peripheral blood mononuclear cells (PBMC) were isolated by density gradient centrifugation using Histopaque (Nakalai tesque, Kyoto, Japan). The serum-free medium to be used for culture was stemline™ II (Sigma-Aldrich), and prepared according to a known method (non-patent document 6) (hereinafter Effective medium, also abbreviated as E medium). Under the conditions of $2 \times 10^6$ cells/2 mL E medium per 1 well, the isolated PBMC was cultured for 5 days (hereinafter the culture is to be also referred to as Effective culture, abbreviated as E culture).

The cell population after culture is a cell population derived from mononuclear cells and enriched with M2 macrophages (hereinafter to be also referred to as M2-rich MNC).

2. Flow Cytometry Analysis

The flow cytometry analysis was performed as follows.

Cell suspensions (45 μL) obtained by separately suspending $4 \times 10^5$ PBMC and M2-rich MNC in 2 mM EDTA/0.2% BSA/PBS buffer were placed in 4 tubes in which equal amounts of labeled antibodies were dispensed in advance, cultured for 30 min at 4° C., and washed twice with 1 mL of 2 mM EDTA/0.2% BSA/PBS buffer. Immediately after fixation in 500 μL of fixation buffer (BioLegend) at room temperature for 20 min, the cells were washed twice with FACS buffer. Then, a cell membrane permeation buffer (BioLegend) was placed in the tubes containing the cells, and the cells were cultured at room temperature for 15 min, stained with anti-CD68-FITC (BIO-RAD), and washed twice with FACS buffer. The data was obtained by FACS Verse (BD Biosciences) and analyzed using FlowJo™ software version 10.2 (Tomy Digital Biology). The details of all monoclonal fluorescence labeled antibodies used are shown in Table 1.

TABLE 1

| Antibody | Isotype | Manufacture name & catalog # |
|---|---|---|
| CD3-FITC | FITC mouse IgM | BioLegent, #201403 and #401606 |
| CD4-PE/Cy7 | PE/Cy7 mouse IgG1, κ | BioLegent, #201516 and #400126 |
| CD8a-AlexaFlour 647 | AlexaFlour 647 mouse IgG1 | BioLegent, #201710 and #400130 |
| CD25-PE | PE mouse IgG1, κ | BioLegent, #202105 and #400112 |
| CD11b/c-PerCP/Cy5.5 | PerCP/Cy5.5 mouse IgG2a | BioLegent, #201820 and #400258 |
| CD68-FITC | FITC mouse IgG1 | BIO-RAD, #MCA1209F and MCA341F |
| CD163-AlexaFlour 647 | AlexaFlour 647 mouse IgG1 | BIO-RAD, #MCA342A647 and MCA1209A647 |
| CD34-PE | PE mouse IgG1, κ | Novus Biologicals, #NBP2-29455 and BioLegent, #400112 |

3. Method for Inducing Myocardial Infarction in Rat and Cell Transplantation Experiment 6- to 10-week-old Lewis rats (male) weighing 150-200 g (Charles River, Japan) were used. Lew-CAG-eGFP transgenic rats (male) obtained from the Japan National BioResource Project (rat) were used for the cell labeling experiment. The animals were anesthetized with 2-4% sevoflurane (Maruishi Pharmaceutical Co., Ltd., Japan), and after sufficient anesthesia, a 14-gauge intravenous catheter was intubated from the mouth and ventilated 60 times at 10 mL/kg per minute with a rodent ventilator (UGO Basile S.R.I., Italy).

Briefly, after thoracotomy of the left chest, the left anterior descending (LAD) artery was sutured according to the method described in the previous report (Iwasaki H. et al., Circulation, 2006; 113:1311-1325) and using Monoplane 6-0 suture (Ethicon Inc., USA). Myocardial infarction was confirmed by blanching of the anterior part of the heart wall apart from the sutured part and rhythm disorder. The chest muscles were sutured with 4-0 nylon and the skin was sutured with 3-0 silk to close the chest. Three days after the induction of myocardial infarction, the group was divided into a group that received administration of M2-rich MNC ($1 \times 10^5$ cells) (M2-rich MNC administration group) and a group that received administration of PBMC ($1 \times 10^5$ cells) (PBMC administration group). RPMI medium (GIBCO) was administered from the tail vein to the control group by using a 24-gauge angiocatheter (TERUMO CORPORATION). Lew-CAG-eGFP transgenic rats were used to track the administered cells.

4. Echocardiography

Echocardiography (EchoCG) of rats was performed using an ALOKA ProSound SSD4000 model equipped with a recorder under 2.0% sevoflurane anesthesia. In this study, baseline transthoracic echo doppler was performed on all rats, and rats that survived after myocardial infarction were monitored for a period of 1, 2, 3, or 4 weeks. The method used for obtaining a two-dimensional short axis diagram of the left ventricle (LV) at the papillary muscle level was a conventional method (Anzai A. et al., Circulation, 2012; 125:1234-1245). From the following equations, the ejection fraction EF=(EDV−ESV)/EDV×100% and the inner diameter shortening rate FS=((LVIDd−LVIDs)/LVIDd)×100% were calculated (Iwasaki H. et al., Circulation, 2006; 113: 1311-1325; Anzai A. et al., Circulation, 2012; 125:1234-1245). A microtip catheter (Miller Instruments Inc., Houston, USA) was used as the heart catheter.

5. Preparation of M2-Rich MNC (Mouse)

M2-rich MNC derived from mouse was prepared using mouse (Cb6F1/S1c) having almost the same genetic background as the pathological model animal of Sjogren's syndrome used in Example 6. According to a known method (non-patent document 6) and the above-mentioned "1. Isolation and culture of PBMC (rat)", PBMC was isolated from mouse, and the isolated PBMC was E-cultured to obtain "M2-rich MNC (mouse)" which is a cell population derived from mononuclear cells enriched with M2 macrophages.

6. Preparation of M2-Rich MNC (Human)

M2-rich MNC was prepared using human peripheral blood. According to a known method (non-patent document 6) and the above-mentioned "1. Isolation and culture of PBMC (rat)", PBMC was isolated from human peripheral blood, and the isolated PBMC was E-cultured to obtain "M2-rich MNC (human)" which is a cell population derived from mononuclear cells enriched with M2 macrophages.

7. Hematoxylin and Eosin (HE Staining)

Serial sections of mouse salivary gland specimens were stained with commercially available hematoxylin solution and eosin solution.

8. RT-qPCR Analysis

Total RNA was isolated from cells and tissues and reversely transcribed into cDNA by using High Capacity cDNA Reverse Transcription kit (Applied Biosystems). The cDNA mixture was diluted with Milli Q water (Millipore Corporation, Billerica, MA), and MR green master mix (Applied Biosystems) was added according to the manufacturer's instructions. Using primers specific for each gene, relative mRNA expression was measured according to the previous report (Bustin S A, et al., Clinical chemistry. 2009; 55(4):611-22.).

9. Statistical Analysis

All values are shown as meantstandard deviation. The Mann-Whitney U test and the Kruskal Wallis test were used for comparison between two groups, and the Dunn's multiple comparison test was used for nonparametric comparison among three groups. In comparison between other groups, 2-way ANOVA and the post-hoc Turkey's test were used to compare values between different time points. GraphPad Prism 7.1 (GraphPad Prism Software Inc., San Diego, CA, USA) was used for all statistical analyses. $P<0.05$ is a statistically significant difference.

Example 1

Gene Expression Profile of M2-Rich MNC

A distribution chart of rat PBMC or M2-rich MNC is shown. Lymphocyte-sized cells (A), monocyte-sized cells (B), and macrophage-sized cell population (C) were each gated from the whole viable cell fraction (FIG. 1). Mononuclear cell/macrophages type 1 (M1 macrophages: M1φ) exhibiting inflammatory properties was identified as CD68-positive, or CD163-negative and CD11b/c double positive cell in all survival cell fractions. Anti-inflammatory and macrophage type 2 (M2 macrophages: M2φ) were identified as CD163-positive and CD11b/c double negative cells in the whole viable cell fractions.

Figure 2:
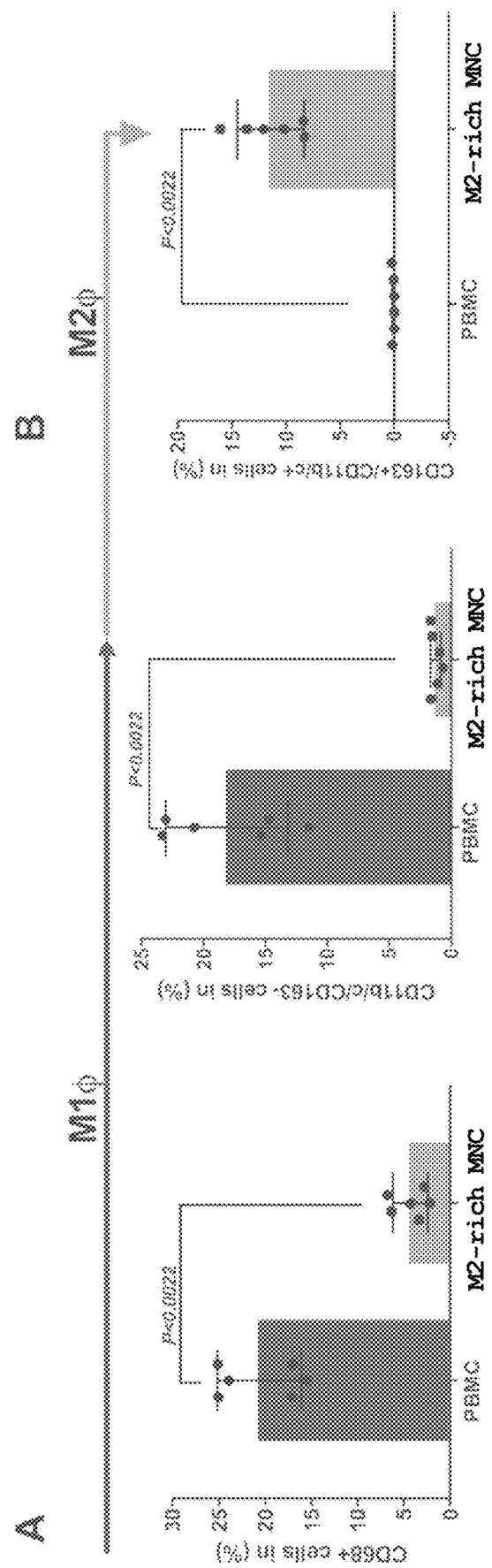
FIG. 2 is a graph showing that M2 macrophage is enriched in a cell population (M2-rich MNC) after E culturing. It was shown that many inflammatory monocytes/macrophages are contained in the PBMC cell suspension (PBMC) (left side: CD68-positive cells, right side: CD11b-positive/CD11c-positive/CD163-negative cells) (A). After E culture, the proportion of M2 macrophages increased rapidly (B) (n=6 in each group). The Mann-Whitney test was used to detect a statistically significant difference. The results are shown in mean±standard deviation.
Figure 3:
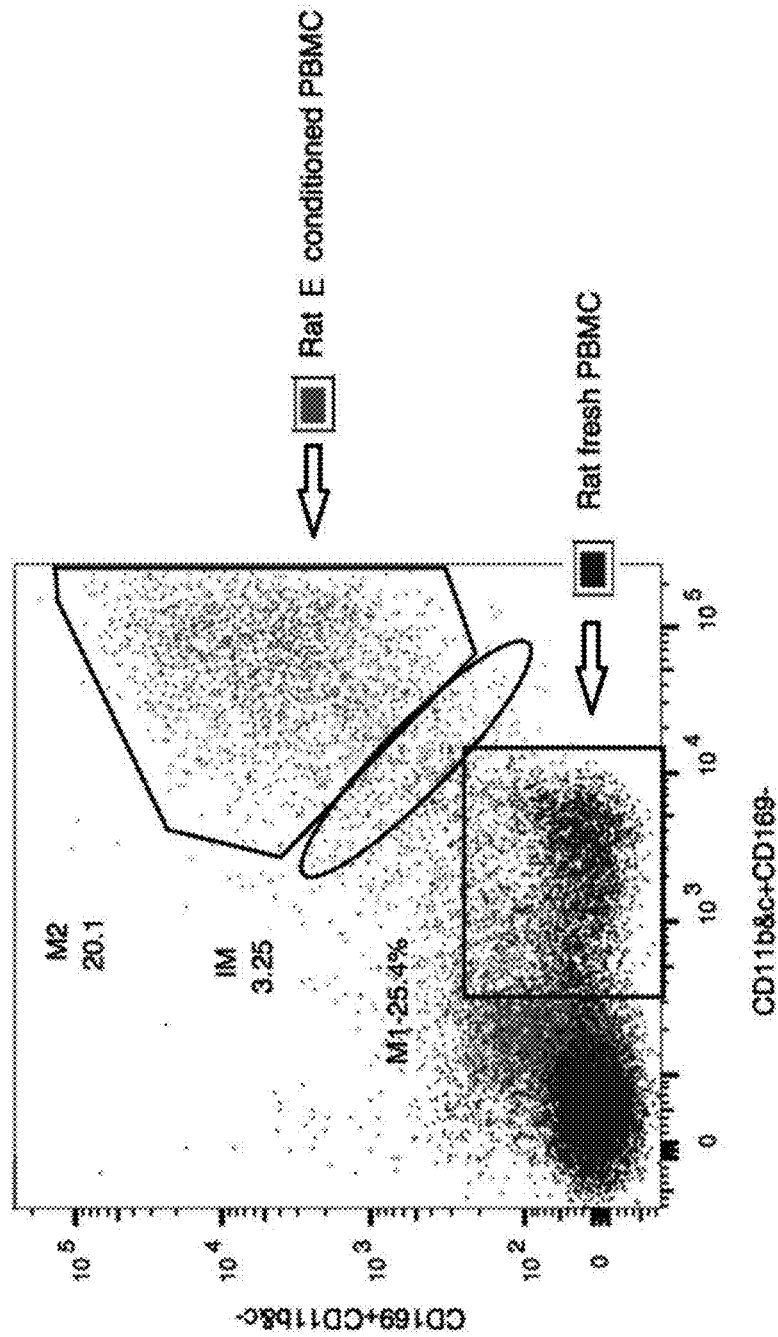
FIG. 3 shows the results of flow cytometry analysis.

As a result of the analysis, the proportion of M1φ was high in the PBMC cell suspension before culturing, whereas the proportion of M1φ significantly decreased in the M2-rich MNC (ratio of CD68-positive cells: 20±1.85% vs 5.5±1.3%, CD163-negative and CD11b/c double positive cell ratio: 17±2.01% vs 1.25±0.16%) (FIG. 2A). In contrast, M2-rich MNC was anti-inflammatory and had a significantly increased proportion of M2 as compared with PBMC (ratio of CD163-positive and CD11b/c double negative cells: 0.06±0.03% vs 13±1.5%; P <0.007). (FIG. 2B, FIG. 3). This data suggests the possibility of conversion of macrophages from classical M1φ to M2φ in PBMC after E culture, and that about 3% of the cells are in an intermediate stage between M1φ and M2φ.

CD38 is known as a marker specifically expressed in rat M1φ, and erg2 and arg1 are known as rat M2φ specific markers. According to RT-qPCR analysis, the expression levels of M2φ markers, arg1 and erg2, increased in M2-rich MNC as compared with PBMC, whereas the expression levels of M1φ markers, CD38 and il1b, decreased. As regards the expression of genes involved in inflammation, for example, the expression of ang1, ang2, and vegfb drastically increased in M2-rich MNC.

Figure 4:
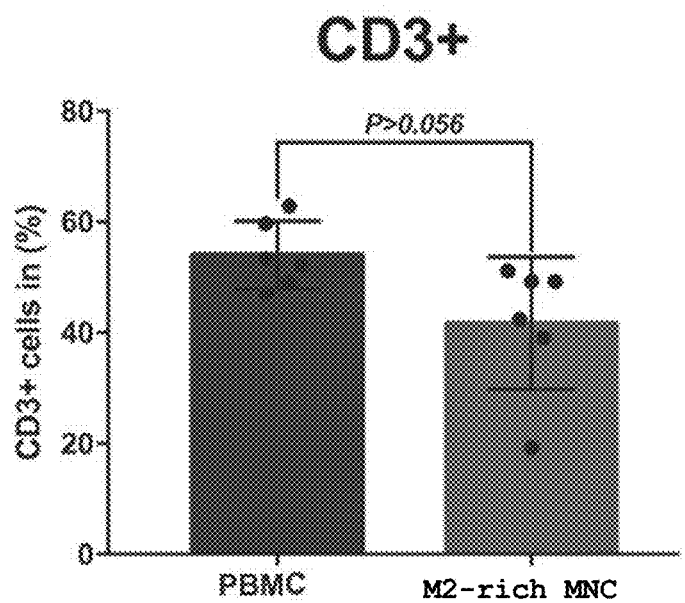
FIG. 4 is a graph showing the percentage of T lymphocytes in PBMC and M2-rich MNC (n=6 in each group). The Mann-Whitney test was used to detect a statistically significant difference. The results are shown in mean±standard deviation.
Figure 5:
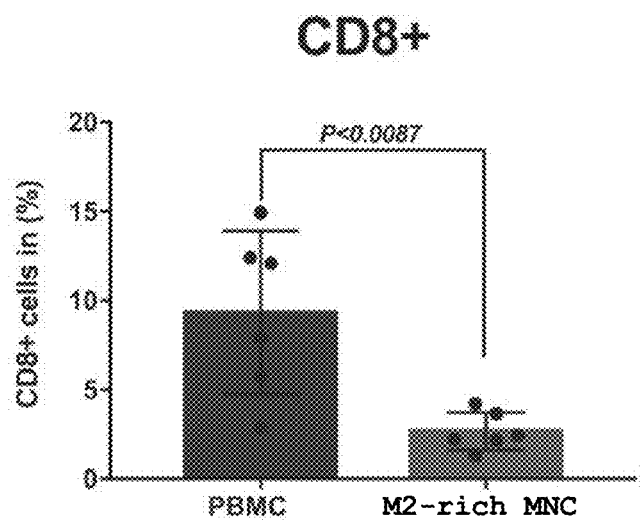
FIG. 5 is a graph showing the percentage of CD8 positive cytotoxic T cells in PBMC and M2-rich MNC (n=6 in each group). The Mann-Whitney test was used to detect a statistically significant difference. The results are shown in mean±standard deviation.

The proportion of T lymphocyte subsets, particularly CD8-positive cells (CD8 is a marker of cytotoxic T cells), decreased from 10% to 2.3% (P<0.0087) of all CD3-positive cells (FIG. 4, FIG. 5). The expression of foxp3 gene, which is an immunosuppressive T cell subset marker, increased 4-fold in M2-rich MNC as compared with PBMC.

From the above, the data of flow cytometry and RT-qPCR demonstrate that, in E-cultured PBMC, the expression of anti-inflammatory cells (M2φ) and anti-inflammatory genes (arg1, erg2) capable of regenerating tissue function, the expression of angiogenic cells (CD34-positive cells, M2φ) and angiogenic genes (Angpt1, Angpt2, Vegfb), and the proportion of anti-inflammatory cells are increased by decreasing cytotoxic T cells and increasing the expression of immunosuppressive gene (Foxp3).

Example 2

Tracking of M2-Rich MNC at Cardiac Ischemic Site and Other Organs

Figure 6:
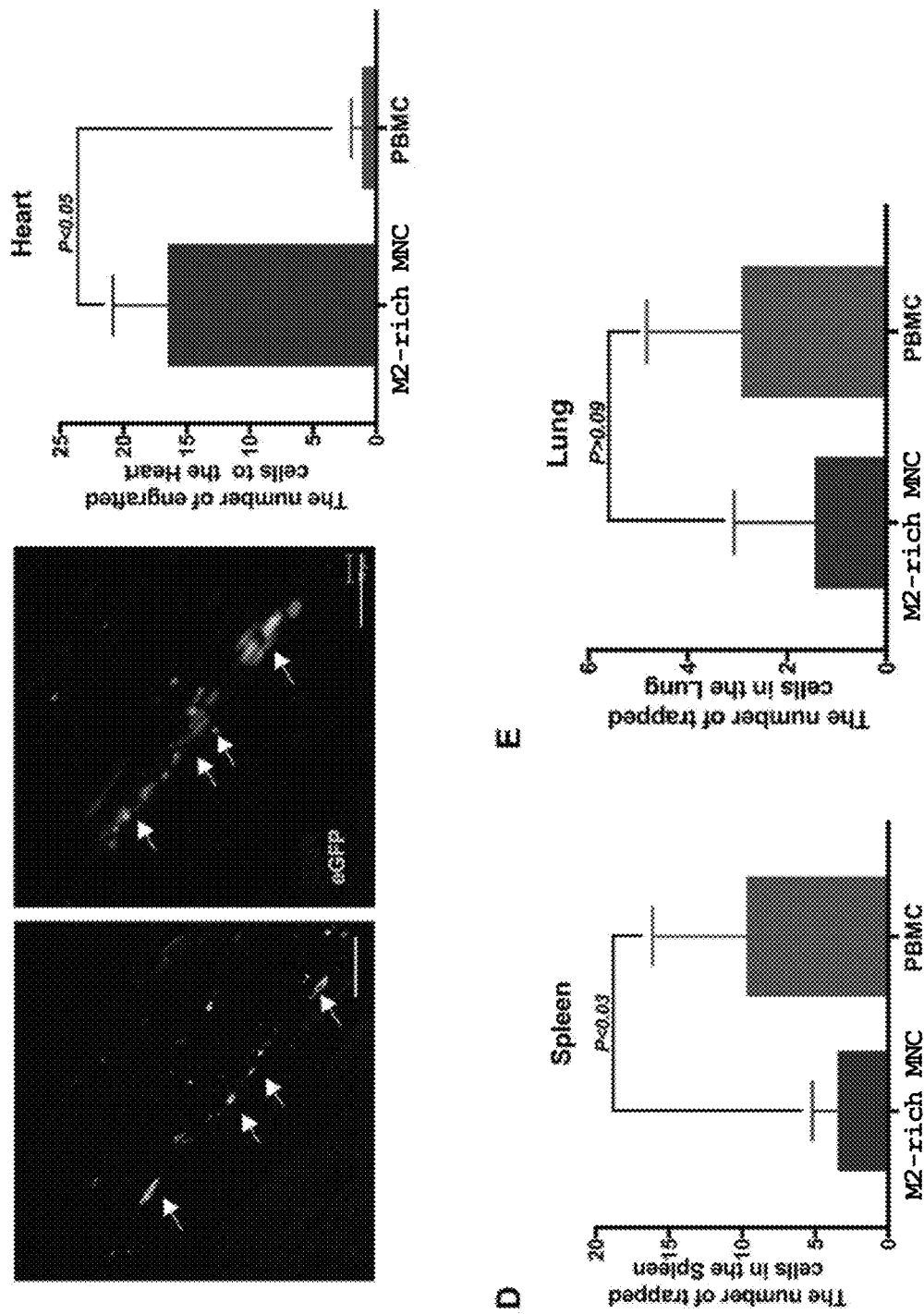
FIG. 6 shows that M2-rich MNC engrafted in myocardial infarction tissue. A) Representative stained image immunohistochemically tracking the eGFP-positive M2-rich MNC entrapped around the infarct site. B) At the infarct site, a remarkable increase in the number of eGFP-positive cells engrafted to the tissue was observed. However, it was not observed in the C) PBMC administration group. Most eGFP-positive PBMCs were trapped in the spleen (D) and lung tissue (E). Scale bar: 20 µm (A) and 40 µm (B). The Mann-Whitney test was used to detect a statistically significant difference. The results are shown in mean±standard deviation.

PBMC and M2-rich MNC were isolated from Lew-CAG-eGFP rats, and $1 \times 10^5$ cells were administered from the tail vein 3 days after the induction of myocardial infarction. Four weeks after cell administration, tracing experiments of administered cells were performed immunohistochemically. In histological analysis, eGFP-positive cells were observed in the ischemic part and tissues around the ischemic part in the M2-rich MNC administration group (FIG. 6A, B); however, they were not observed in the PBMC administration group (FIG. 6C). Furthermore, many eGFP-positive cells were trapped in the spleen and lungs, which are soft tissues, in the PBMC administration group as compared to the M2-rich MNC administration group (FIG. 6D, E).

Example 3

Effect of M2-Rich MNC on LV Performance and LV Reconstruction

Rats were weighed before and 28 days after surgery. At 4 weeks after surgery, the M2-rich MNC administration group weighed 306.4±5.9 g, which was more than the PBMC administration group (277.6±6.1 g, P<0.0001), and control (283.3±8.3 g, P<0.002). The body weight of the M2-rich MNC administration group increased as compared with the Sham-operated group (281.5±7.9 g, P<0.01). Continuous echocardiographic (EchoCG) measurements were performed in the M2-rich MNC administration group (n=9), PBMC administration group (n=11), control group (n=9), and Sham-operated group (n=5). From the 2nd week to 28 days after the induction of myocardial infarction, the inner diameter shortening rate (FS) increased (45.5±4.6%) in the M2-rich MNC administration group, whereas an increase in FS was not observed in the PBMC administration group (30.87±6.38%, P<0.0001), and the control group (32.15±7.74%, P<0.0008). The EchoCG index, including ischemic site volume and left ventricular contraction function (LVSDs), increased to (94.4±3.7 µl and 0.35±0.03 cm) in the M2-rich MNC administration group. However, the LV function value deteriorated to (63.6±6.07 µl, P<0.004 and 0.49±0.03 cm, P<0.0002) in the PBMC administration group, and (71.1±2.0 µl, P<0.03 and 0.46±0.03 cm, P<0.005) in the control group. In 2D Doppler mode analysis, a mild or moderate mitral valve functional disorder was observed in the PBMC administration group and the control group, whereas a mitral valve functional disorder was not observed in the M2-rich MNC administration group.

Figure 7:
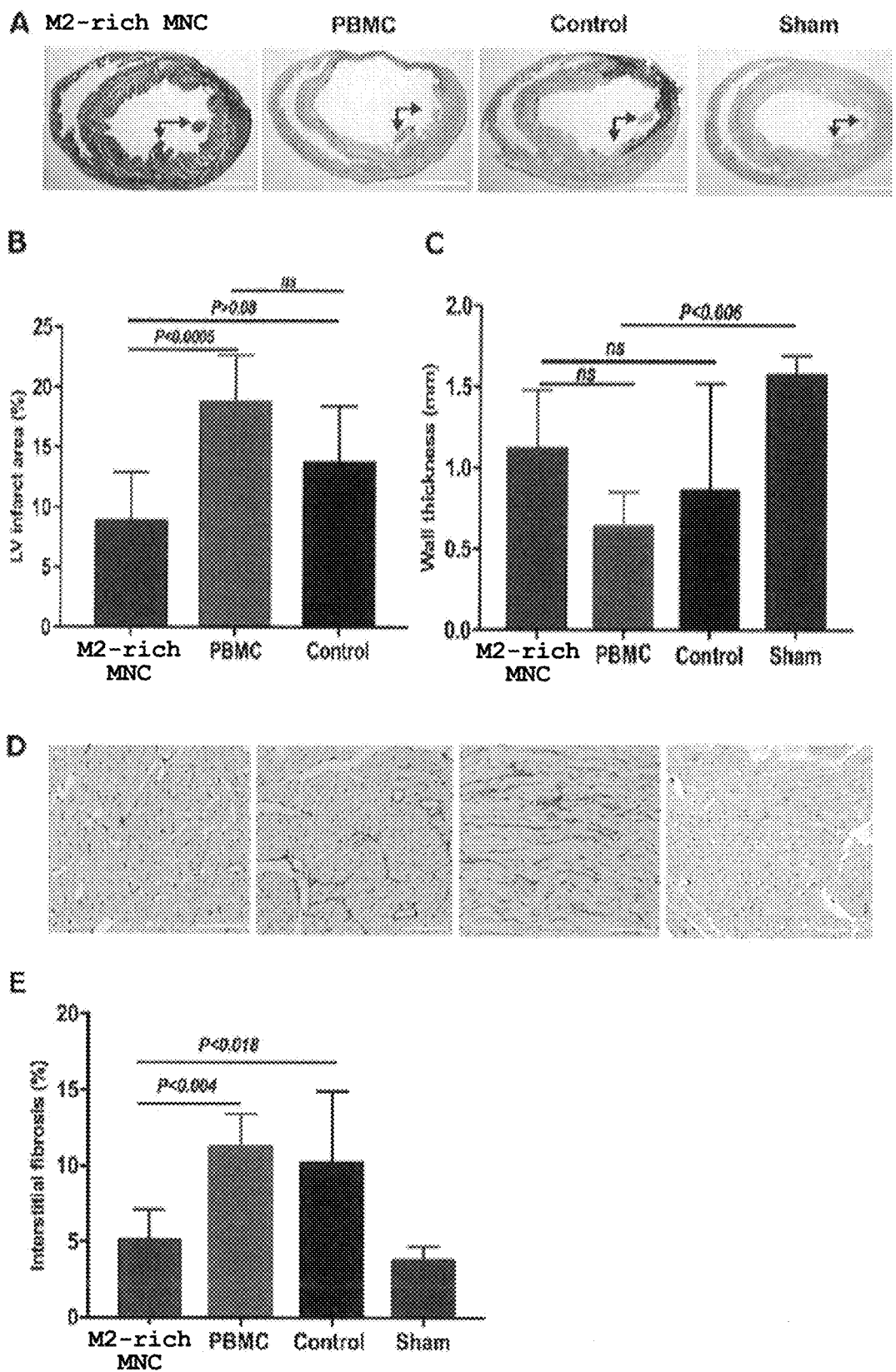
FIG. 7 shows representative staining diagrams of picrosirius red staining of rat cardiac tissue 28 days after myocardial infarction in the M2-rich MNC administration group, PBMC administration group, control group, and Sham-operated group (A, D). B and C show that the area of the infarct site of the left ventricle and the thickness of the ventricular wall were maintained in the M2-rich MNC administration group, whereas the area of the infarct site increased with the thinning of the chamber wall in the PBMC administration group and the control group. E indicates the rate of interstitial fibrosis. The 2-way ANOVA and Post-hoc Turkey's multiple comparison test were used to detect a statistically significant difference. The results are shown in mean±standard deviation.

Interestingly, results similar to this result were also obtained with Sirius red staining. The papillary muscles on the LV anterior-lateral side and the posterior-lateral side of the PBMC administration group and the control group were damaged after myocardial infarction (FIG. 7A). Further histological analysis revealed that the site of ischemic injury spread and the heart wall became thinner due to the excessive inflammatory reaction in the PBMC administration group and the control group. On the other hand, they were maintained in the M2-rich MNC administration group, indicating that LV reconstruction and heart wall thickening were promoted in the M2-rich MNC administration group (FIG. 7A-C). Collagen fragmentation between stromas significantly increased in the PBMC administration group, and tissue fibrosis was also high in the control group, even though there was no statistically significant difference from the M2-rich MNC administration group (FIG. 7D, E).

Example 4

Formation of Bilateral "Functional Bypass" After Infarction by M2-Rich MNC

A "functional bypass" was observed 4 weeks after intraperitoneal administration of rat M2-rich MNC. This is a phenomenon in which arterial blood is bypassed at a site apart from the LAD suture part. This bypass was not observed in the PBMC administration group or the control group, severe adhesion to the LV aneurysm and surrounding tissues (thymus and anterior chest wall) was seen, and it prevented beating of the heart. To confirm whether this phenomenon was vascular bypass, instantaneously frozen slices of cardiac tissue were stained with isolectin B4 and aSMA. From the analysis of three-dimensional steric reconstruction image of confocal microscope, many sites of blood vessel staining with aSMA were found in ischemic sites, wide blood vessel inner diameter values were shown, and the ischemic site was surrounded by small arteries derived from the chest wall (probably the intercostal artery and endothorax artery).

Example 5

Effect of M2-Rich MNC on Angiogenesis in Rat Myocardial Infarction

Figure 8:
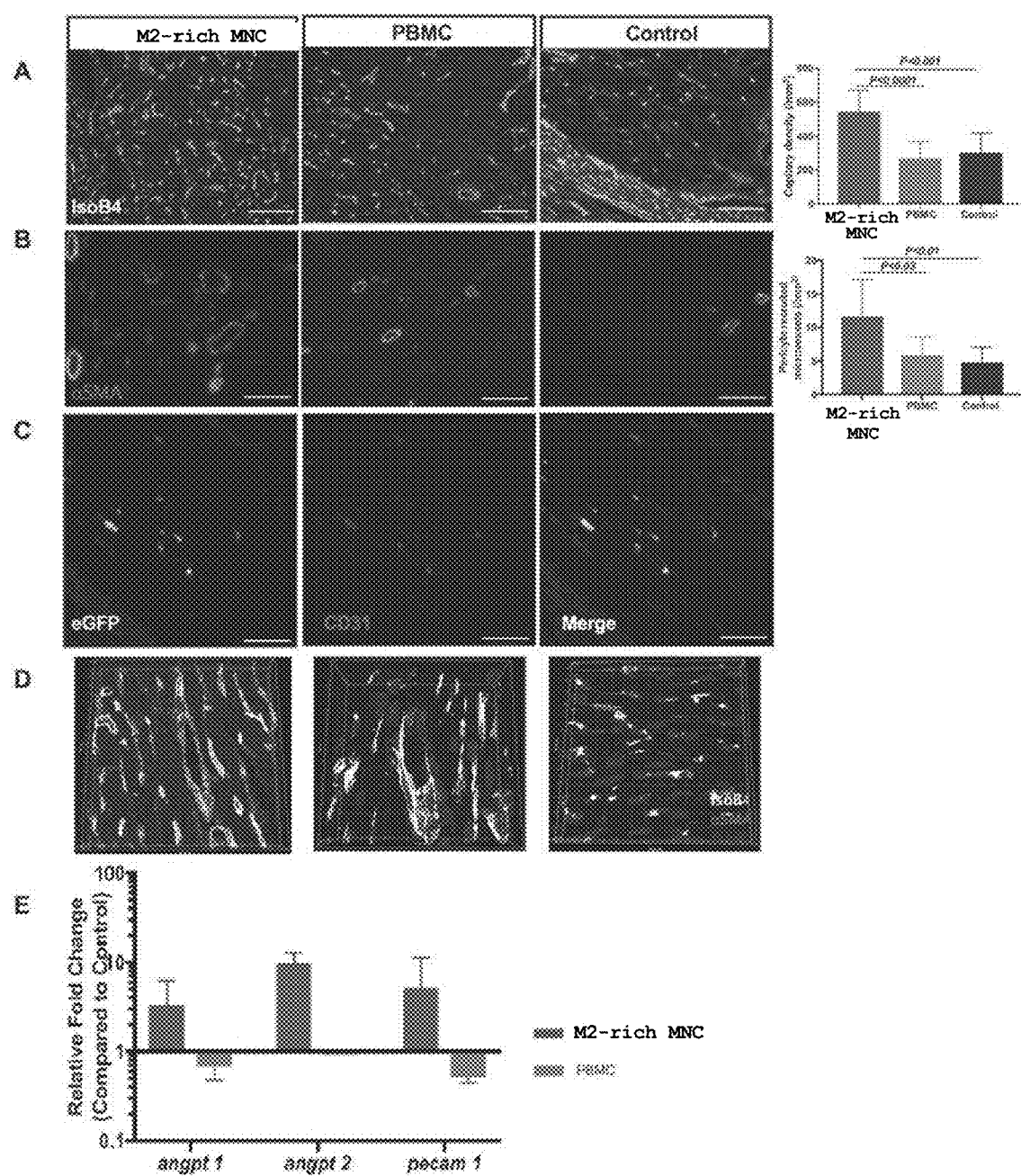
FIG. 8 shows that M2-rich MNC promoted angiogenesis and arteriogenesis at an infarct site. Average angiogenesis was evaluated in 6 randomly obtained 20-fold images including the boundary region and the infarct site. A) In the M2-rich MNC group, the density of statistically functional microvessel increased, B) small arteries stained with αSMA per square millimeter were observed; however, density increase or small artery formation was not observed in the PBMC administration group and the control group. C) From immunohistochemistry, CD31-positive cells expressing eGFP under E culture conditions extended tube length in the host tissue. D) Representative stained images of Isolectin B4 and αSMA at the infarct site of the M2-rich MNC administration group, PBMC administration group, and the control group, which were obtained by three-dimensional reconstruction of the confocal microscopic image in the Z-axis direction. E) Relative expression of the genes involved in angiogenesis, such as angpt1, angpt2, and pecam1, in the infarct site tissue 6 days after the induction of myocardial infarction (all values are displayed logarithmically). Scale bar: 20 µm. The Kruskal-Wallis and Post-hoc Dunn's multiple comparison test were used to detect a statistically significant difference. The results are shown in mean±standard deviation.

In FIG. 8A, microvessel density (MVD) was examined by isolectin B4-FITC staining. MVD was significantly higher in the M2-rich MNC administration group ($558\pm44.4/mm^2$) as compared with the PBMC administration group ($260\pm35.7/mm^2$, P<0.0001) and the control group ($298\pm45.5/mm^2$, P<0.0001). To examine the formation of functioning blood vessels, the small artery density per 1 $mm^2$ at the ischemia site was calculated. As a result, it was higher in the M2-rich MNC administration group as compared with the PBMC administration group ($5.714\pm2.9/mm^2$, P<0.03), and the control group ($4.67\pm2.4/mm^2$, P<0.01) (FIG. 8B).

From the reconstruction of the three-dimensional steric images using a confocal microscope, the MVD value was higher in the M2-rich MNC administration group than in the PBMC administration group and the control group (FIG. 8C). To examine whether the administered M2-rich MNC can differentiate into vascular endothelial cells in the heart of the host, immunohistochemical analysis was performed using Lew-CAG-eGFP transgenic rats. As a result, the administered eGFP-labeled M2-rich MNC expressed CD31, which is a marker for vascular endothelial cells, and MVD per 1 $mm^2$ also increased in the M2-rich MNC administration group. However, such results were not shown in the PBMC administration group (FIG. 8D). From analysis by RT-qPCR, the expression of genes involved in angiogenesis such as angpt1, angpt2 and pecam1 increased 3-fold, 9-fold, and 5-fold, respectively, 3 days after cell administration in the M2-rich MNC administration group as compared with the control group. In the PBMC administration group, the expression of those genes decreased 2-fold, 1-fold, and 2-fold as compared with the control group (FIG. 8E).

Example 6

Effect of M2-Rich MNC on the Progression of Salivary Gland Pathology (lymphocyte Infiltration) in Mice with Naturally Occurring Sjogren's Syndrome Using pathological model mice, it was confirmed that M2-rich MNC can efficiently reach the inflammation site and exhibit efficacy without being trapped in the lungs and the like.

As the pathological model animal, mice with naturally occurring Sjogren's syndrome (Japan SLC, NOD) were used. This mouse is known to spontaneously develop Sjogren's syndrome-like salivary gland disorders. After the onset of salivary gland disorder (after 8 weeks of age), M2-rich MNC (mouse) was administered from the tail vein, and pathological analysis of salivary gland tissue was performed at the age of 20 weeks when salivary gland secretion disorder occurs. Salivary gland tissues were collected from each of a cell administration group administered with M2-rich MNC, one mouse (cell administration group 1) and a non-treatment group, two mice (non-treatment groups 1, 2), and the "lymphocyte infiltrated region" was specified by histopathological observation.

To standardize the area measurement values, serial sections were created from a single salivary gland, respective salivary gland tissue area per one section of multiple HE-stained sections (3 to 6) was calculated using image analysis software (NIH ImageJ), and mean and standard deviation (SD) were calculated. The lymphocyte infiltrated region was enlarged at the same magnification by image analysis software to enable relative comparison of the area between sections.

The salivary gland tissue area per one section was 97,492-139,148 pixels, and a significant difference was not found between the cell administration group and the non-treatment group.

Figure 9:
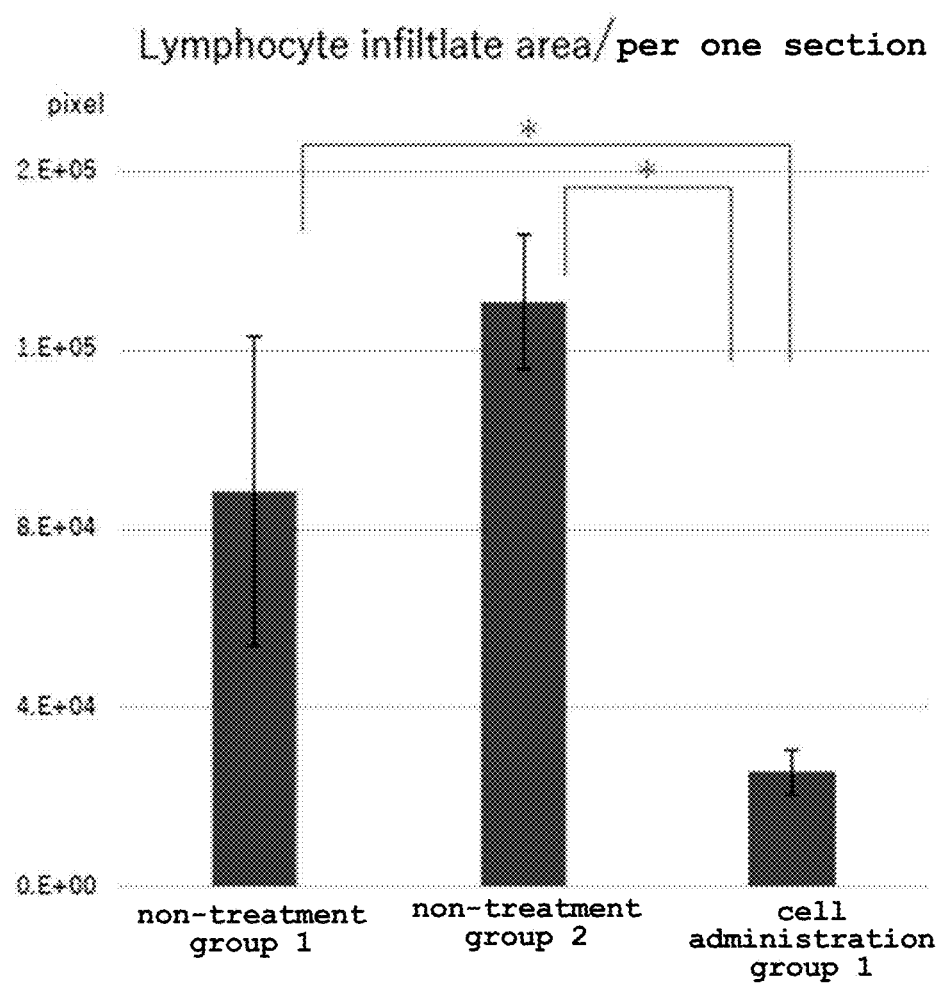
FIG. 9 is a graph showing the results of measurement and comparison, by using image analysis software, of the area of the lymphocyte infiltrated part in the salivary gland tissue of M2-rich MNC administration group (cell administration group 1) and non-treatment group (non-treatment group 1, non-treatment group 2), whose serial sections of salivary gland specimens were stained with HE. The results are shown in mean±standard deviation. (cell administration group 1: n=3, non-treatment group 1: n=5, non-treatment group 2: n=5).

On the other hand, a remarkable difference in the area of lymphocyte infiltrated part per one section was confirmed between the cell administration group and the non-treatment group (FIG. 9).

It was confirmed that the area of the lymphocyte infiltrated part was small in the cell administration group as compared with the non-treatment group.

From the above results, it was confirmed that, not only in rats, but also in mice, systemically administered M2-rich MNC exhibited an anti-inflammatory action in the topical inflamed site without being trapped in the lungs, and the like, and contributed to the regeneration of tissue function.

Example 7

Enrichment of M2 Macrophage by E Culture of Human PBMC

According to a known method (non-patent document 6) and the above-mentioned "1. Isolation and culture of PBMC (rat)", isolation of PBMC derived from human peripheral blood, and E-culture of the isolated PBMC were performed. The period of E culture was 5-8 days, and the cells were recovered, depending on the experiment, on day 5, day 6, day 7, or day 8 from the start of the culture (indicated as day5, day6, day7, day8, respectively).

Mononuclear cell/macrophage type 1 (M1 macrophage) which is positive to CD11b (mononuclear cell/macrophage specific marker), and exhibiting inflammatory properties was identified as CD11b and CCR2 double positive cell in all surviving cell fractions. Macrophage type 2 (M2 macrophage) exhibiting anti-inflammatory properties was identified as CD11b and CD206 double positive cell in all surviving cell fractions.

The experiment was conducted 6 times each independently. The peripheral blood collected from donor 1 was used in experiment 1, experiment 3, and experiment 6, the peripheral blood collected from donor 2 was used in experiment 2 and experiment 4, and the peripheral blood collected from donor 3 was used in experiment 4, and PBMC was isolated and E cultured (blood collection dates of PBMC derived from the same donor are different).

Figure 10:
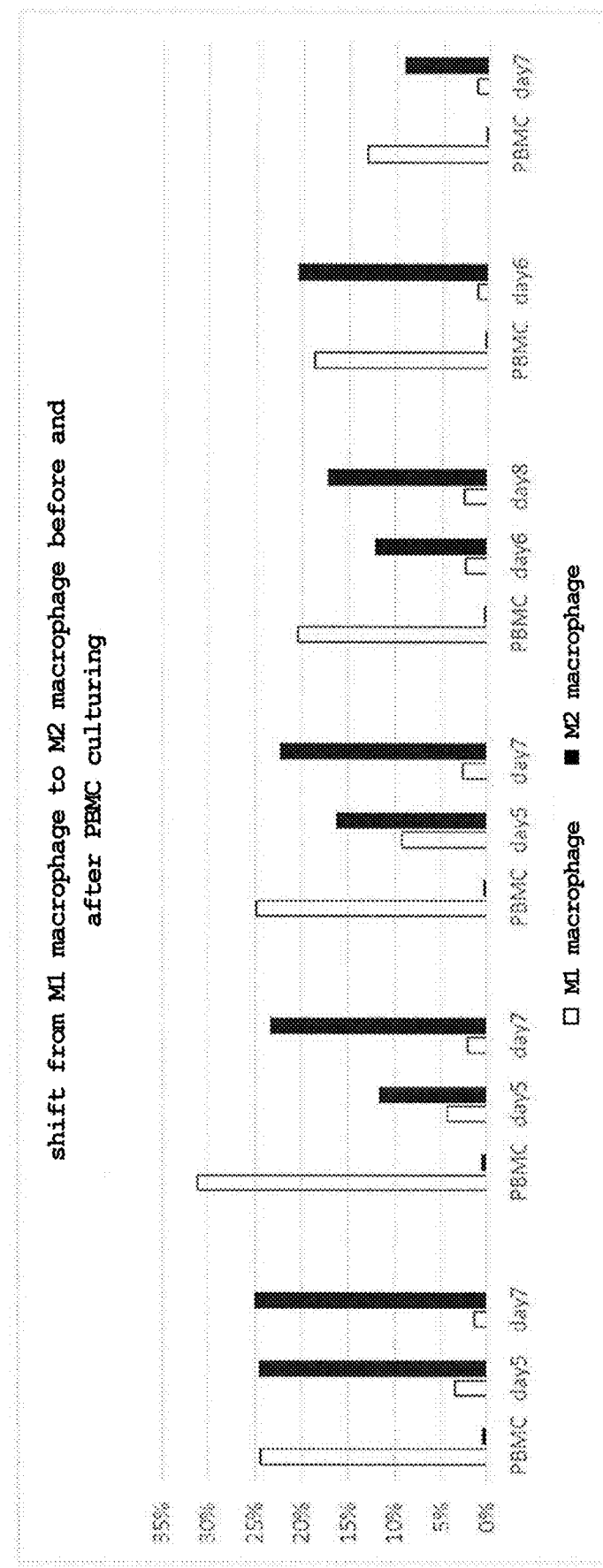
FIG. 10 is a graph showing that M2 macrophage is enriched in a cell population (M2-rich MNC) after E culturing. The experiment was performed 6 times (experiments 1-6), and the proportion of M2 macrophages increased by E culturing in all cases.

The analysis results are shown in Table 2 and FIG. 10.

TABLE 2

| | experiment 1 | | | experiment 2 | | |
|---|---|---|---|---|---|---|
| | before culture | after E culture | | before culture | after E culture | |
| | PBMC | day 5 | day 7 | PBMC | day 5 | day 7 |
| M1 macrophage (CD11b/CCR2 double positive) | 24% | 3% | 1% | 31% | 4% | 2% |
| M2 macrophage (CD11b/CD206 double positive) | 0% | 25% | 25% | 1% | 11% | 23% |

| | experiment 3 | | | experiment 4 | | |
|---|---|---|---|---|---|---|
| | before culture | after E culture | | before culture | after E culture | |
| | PBMC | day 5 | day 7 | PBMC | day 6 | day 8 |
| M1 macrophage (CD11b/CCR2 double positive) | 25% | 9% | 3% | 20% | 2% | 2% |
| M2 macrophage (CD11b/CD206 double positive) | 0% | 16% | 22% | 0% | 12% | 17% |

| | experiment 5 | | experiment 6 | |
|---|---|---|---|---|
| | before culture PBMC | after E culture day 6 | before culture PBMC | after E culture day 7 |
| M1 macrophage (CD11b/CCR2 double positive) | 19% | 1% | 13% | 1% |
| M2 macrophage (CD11b/CD206 double positive) | 0% | 20% | 0% | 10% |

As is clear from Table 2 and FIG. 10, M2 macrophage was scarcely detected in PBMC before culture in different donors. However, M1 macrophage was present in 10-30% of all PBMC cells, which is higher than for M2 macrophage. On the other hand, after day 5 of E culture, M2 macrophage was generally drastically enriched (7% or more, mostly 9% or more, of all mononuclear cells), and M1 macrophage drastically decreased (5% or less, mostly 3% or less, of all mononuclear cells). This tendency was more remarkable on day 6 and day 7 than day 5 of culture.

INDUSTRIAL APPLICABILITY

The pharmaceutical composition of the present invention contains a cell population containing enriched M2 macrophage. When the composition is systemically administered, the cell population is not trapped in the lungs and accumulates at the disordered/inflamed site. Therefore, the pharmaceutical composition of the present invention can transfer cells having an anti-inflammatory action in the number effective for the treatment to the target inflammation or tissue damage site.

The invention claimed is:

1. A method for the treatment of an inflammatory disease, comprising administering an effective amount of cell population enriched in M2 macrophage to a target in need thereof, wherein the cell population comprises the M2 macrophage in a proportion of not less than 7%.

2. The method according to claim 1, wherein the cell population further comprises the M1 macrophage in a proportion of less than 10%.

3. The method according to claim 1, wherein the M2 macrophage is enriched by culturing body fluid-derived mononuclear cells in a serum-free medium, without medium change or passage.

4. The method according to claim 1, wherein the administration is systemic administration.

5. The method according to claim 1, wherein the inflammatory disease is an autoimmune disease.

* * * * *